United States Patent [19]

Herr

[11] Patent Number: 4,637,492

[45] Date of Patent: Jan. 20, 1987

[54] LATCH MECHANISM FOR BOAT ACCESSORIES

[76] Inventor: Richard W. Herr, 1580 52nd St., Marathon, Fla. 33050

[21] Appl. No.: 814,557

[22] Filed: Dec. 30, 1985

[51] Int. Cl.⁴ .................. B63B 29/20; E06C 5/24
[52] U.S. Cl. ................................ 182/93; 182/92; 182/206; 248/221.4; 403/252; 403/199
[58] Field of Search ............. 182/87, 93, 92, 206; 403/252, 254, 255, 199, 197, 201; 248/221.4

[56] References Cited

U.S. PATENT DOCUMENTS

| | | | |
|---|---|---|---|
| 362,548 | 5/1887 | Smith | 403/252 |
| 998,582 | 7/1911 | Lucas | 403/252 |
| 2,622,298 | 12/1952 | Macedo | 403/201 |
| 3,285,366 | 11/1966 | Lindsey | 182/92 |
| 3,374,859 | 3/1968 | Dobert | 182/92 |
| 3,512,608 | 5/1970 | Huntley | 182/93 |
| 3,574,367 | 4/1971 | Jankowski | 403/201 |
| 3,647,023 | 3/1972 | Bedford | 182/93 |
| 4,249,683 | 2/1981 | Park | 182/93 |
| 4,431,082 | 2/1984 | Bott | 182/93 |
| 4,556,337 | 12/1985 | Marshall | 403/255 |

*Primary Examiner*—Reinaldo P. Machado
*Attorney, Agent, or Firm*—Kokjer, Kircher, Bradley, Wharton, Bowman & Johnson

[57] ABSTRACT

A latch mechanism for attaching accessories such as boarding ladders, ski tow bars and lights to a small boat. A latch plate is secured to the boat and carries a socket having an internal annular rib. A tube projecting from the accessory carries a pair of opposed latch elements each having an enlarged head extending out of the tube. A U-shaped spring wire urges the latch elements apart toward a latching position in which the heads of the elements securely interlock with the rib when the tube is fully inserted in the socket. Cam surfaces on the latch heads interact with the rib to displace the heads so that they can pass the rib as the tube is being inserted. Each latch element has a release button which extends through the side of the tube. When the buttons are depressed, the latch elements are released from the rib to permit the tube to be withdrawn from the socket.

20 Claims, 7 Drawing Figures

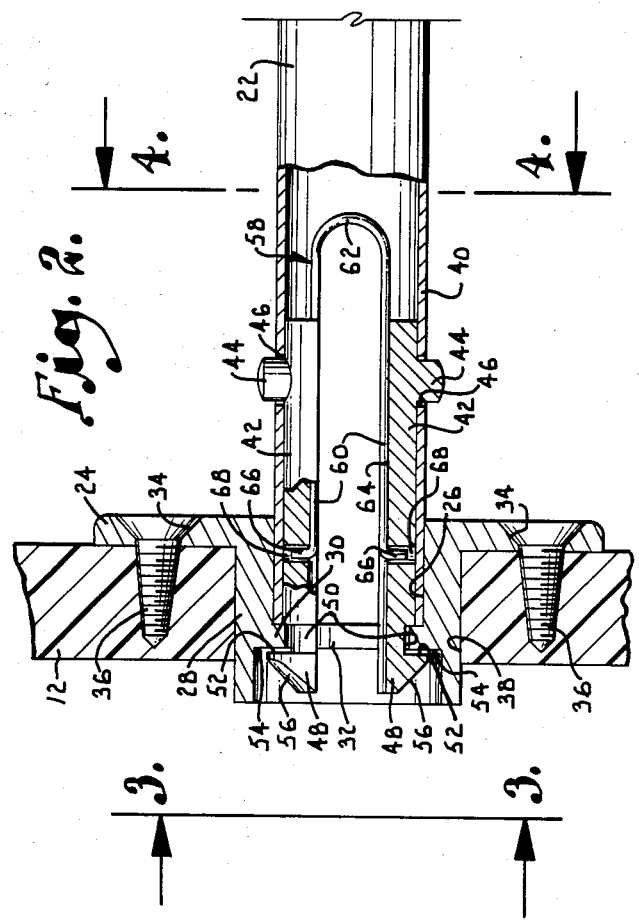
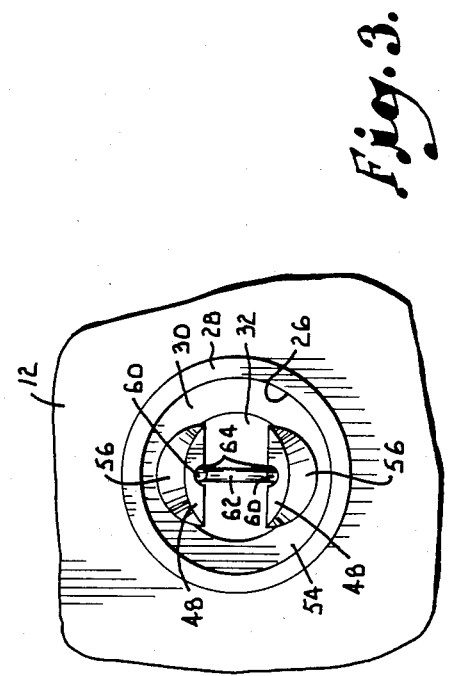
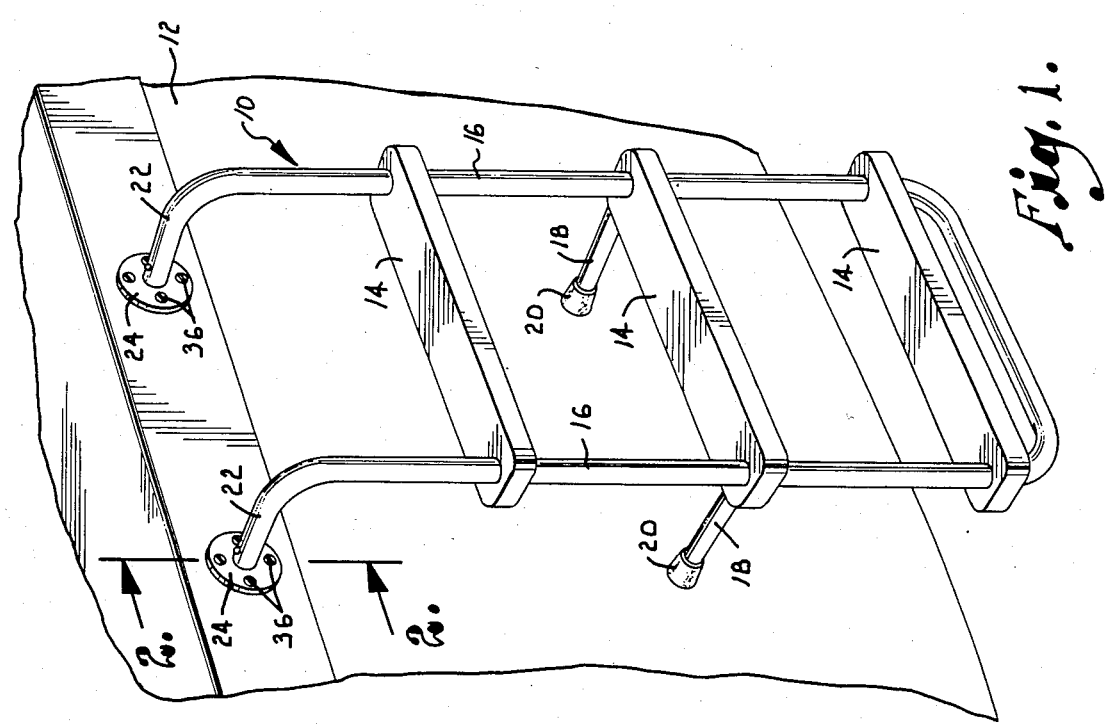

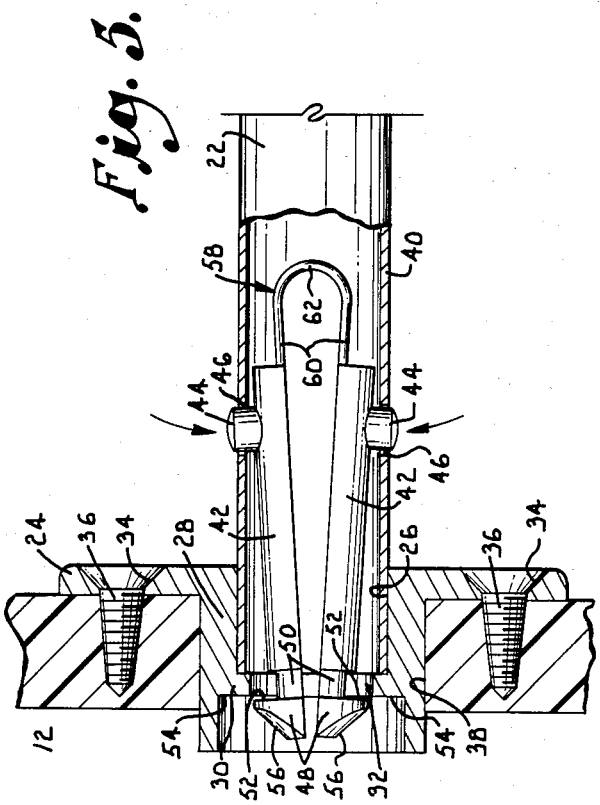
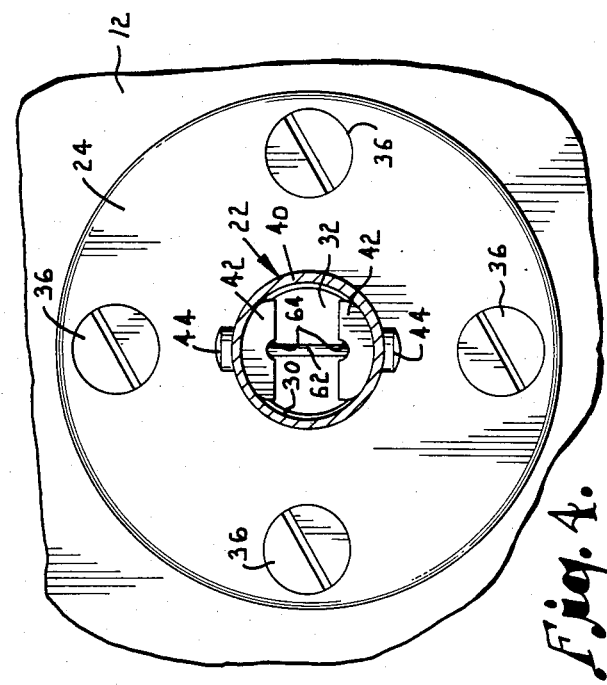
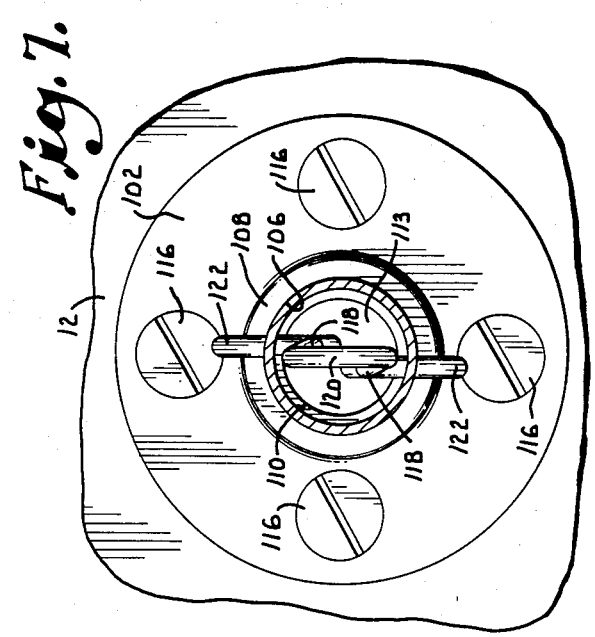
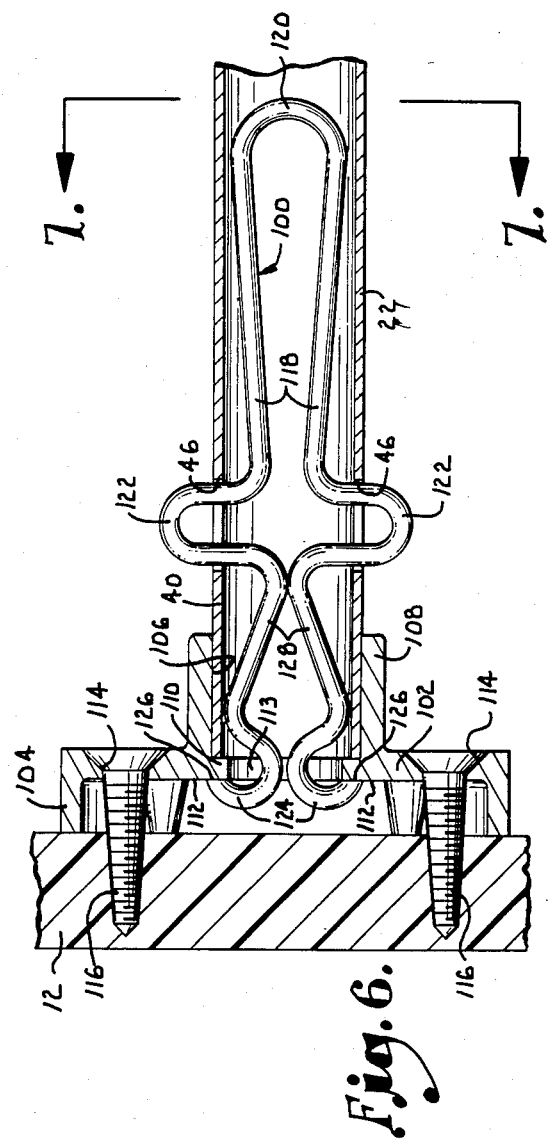

4,637,492

LATCH MECHANISM FOR BOAT ACCESSORIES

BACKGROUND OF THE INVENTION

This invention relates in general to the attachment of ladders, ski tow bars, running lights and other accessories to a boat. More particularly, the invention relates to an improved latch mechanism which securely mounts an accessory to a boat and yet allows it to be quickly and easily detached when not in use.

There are a number of accessories which are occasionally used on small boats and which are desirably detached from the boat when not in use. For example, boarding ladders are used to facilitate boarding of the boat from the water by swimmers and skiers. When not in use, the ladder should be detached or folded up in order to prevent it from being obstructive. Often, boarding ladders have curved arms on their upper ends which are hooked over the gunwale when the ladder is in place. On some boats, such as those having unusual gunwales, hook type ladders are impractical and the ladder must somehow be securely latched to the boat. One type of latch arrangement that has achieved considerable popularity includes mounting brackets which are secured to the boat and provided with key hole slots to receive bolt heads projecting from the ends of the ladder. The principal problem with this arrangement is that the bolt head can slip out of the key hole slot due to vibration or forces that are applied when the ladder is being used for boarding of the boat in rough water.

Ski tow bars are likewise normally secured in a detachable manner to boats which are used to tow water skiers. The latch for the ski tow bar typically includes a pin which extends down through the deck of the boat and is secured by a cross pin inserted below the deck. The main problem with this arrangement is that it requires the boat deck to be constructed such that the skier can reach beneath it to insert the cross pin during installation of the tow bar and to remove the cross pin when the tow bar is to be detached.

Lights used on the bow and stern of a small boat present some of the same problems and additional problems as well. It is necessary to equip each light with an electrical system which provides power when the light is mounted yet allows the light to be disconnected from the boat when not needed. In order to permit the light to be aimed in various directions, it is necessary to provide wiping type electrical contacts which must maintain good electrical contact at the various rotational positions of the light. This problem is compounded by the fact that the light is used in a marine environment where moisture and corrosion can create significant problems.

SUMMARY OF THE INVENTION

It is the principal goal of the present invention to provide an improved latch mechanism which acts to secure various accessories in place on a boat and which exhibits sufficient strength to withstand vibrational forces and all other forces that are applied to the accessories in normal service.

Another important object of the invention is to provide a latch mechanism of the character described which can be quickly and easily engaged and released and yet is not susceptible to inadvertent release. In this respect, it is an important feature of the invention that the latch is constructed so that it can be applied simply by inserting a tube into a mating socket. Release of the latch requires depression of opposing release elements which can be easily depressed when desired but which are not subject to being accidentally depressed.

A further object of the invention is to provide a latch mechanism of the character described which is particularly well suited for latching boarding ladders to boats, as well as other components such as ski tow bars and lights. With respect to the mounting of lights, it is an important feature of the invention that the spring action of the latch provides good "wiping" electrical contact which is reliably maintained even in a marine environment.

An additional object of the invention is to provide a latch mechanism of the character described which functions in a safe and reliable manner.

Yet another object of the invention is to provide, in a latch mechanism of the character described, a socket that can be mounted either on the surface or at a recessed location on the boat.

A still further object of the invention is to provide a latch mechanism of the character described which is constructed in a simple and economical manner and which can be used to latch a ladder or other accessory in place without requiring extensive modification of the boat.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary perspective view of a boat to which a boarding ladder is attached by a latch mechanism constructed according to a preferred embodiment of the present invention;

FIG. 2 is a fragmentary sectional view on an enlarged scale taken generally along line 2—2 of FIG. 1 in the direction of the arrows;

FIG. 3 is a fragmentary elevational view taken generally along line 3—3 of FIG. 2 in the direction of the arrows;

FIG. 4 is a fragmentary sectional view taken generally along line 4—4 of FIG. 2 in the direction of the arrows;

FIG. 5 is a fragmentary sectional view similar to FIG. 2, but showing the latch mechanism in its release position;

FIG. 6 is a fragmentary sectional view similar to FIG. 2, but showing a latch mechanism constructed according to a second embodiment of the invention; and FIG. 7 is a fragmentary sectional view taken generally along line 7—7 of FIG. 6 in the direction of the arrows.

DETAILED DESCRIPTION OF THE INVENTION

Referring now to the drawings in more detail and initially to FIG. 1, numeral 10 generally designates a boarding ladder of the type which may be secured to the stern 12 of a small boat by the latch mechanism of the present invention. The ladder 10 includes a plurality of steps 14 extending between parallel legs 16 which take the form of hollow metal tubes. A pair of stand off arms 18 extend from the ladder and are provided with cushions 20 on their ends to rest against the stern 12. The upper ends of the legs 16 are bent through 90° to provide parallel, horizontal tubes 22 which may be attached to the stern 12. The ladder 10 may be constructed of aluminum.

With additional reference to FIGS. 2-5, the latch mechanism of the present invention includes a circular metal latch plate 24 for each of the tubes 22. Extending into the center of each latch plate 24 is a socket 26 formed within a cylindrical wall 28 which extends from the latch plate. Each socket 26 is open on its outer end. An annular rib 30 extends from the socket wall 28 and projects into the socket 26. The rib 30 provides a restricted space 32 which is smaller in diameter than the remainder of the socket.

Each latch plate 24 is provided with a plurality of screw holes 34 located outwardly of the socket wall 28. Screws 36 may be extended through the holes 24 and threaded into the stern 12 of the boat in order to mount the latch plate 24 flush against the surface of the stern. The socket extends closely through a hole 38 drilled in the stern. The sockets 26 are spaced apart the same distance as the tubes 22, and the diameter of the main portion of each socket 26 is the same as or slightly greater than the outside diameter of tubes 22 so that the tubes can be closely fitted in the sockets. Latch plates 24 and the attached structure may be constructed of aluminum.

Each tube 22 has a cylindrical wall 40 which is open at the end. Carried in the end portion of each tube is a latch assembly which includes a pair of opposed latch elements 42. Each latch element 42 has a curved surface which conforms with the curvature of the inside surface of the tube wall 40. A small release button 44 projects from the body of each latch element 42 and extends through an opening 46 formed in the tube wall 40. The buttons 44 are at diametrically opposed positions on each tube 22 and are accessible in order to effect release of the latch mechanism, as will be described more fully.

Each latch element 42 projects beyond the end of tube 22 and is provided on its projecting end with an enlarged head 48 located beyond the end of the tube. A groove 50 is formed in the curved surface of each latch element 42 at a location adjacent the head 48. The grooves 50 are located adjacent to the tube end, and a flat shoulder 52 is formed on each head 48 adjacent the groove 50. The shoulders 52 face toward the tube end and are engageable with a flat latching surface 54 which is formed on rib 30 and which faces away from the tube end and the open end of the socket. The leading end of each head 48 is provided with an inclined cam surface 56. Latch elements 42 may be aluminum.

The latch elements 42 are continuously urged apart by a U-shaped spring wire 58 having a pair of generally parallel legs 60 connected by a curved bight 62. The legs 60 are received in small grooves 64 which are formed in flat sides of the latch elements which face one another, as best shown in FIGS. 3 and 4. The free end 66 of each leg 60 is bent outwardly and fits closely in a small passage 68 formed in the latch element 42. The spring construction of the wire 58 continuously urges the legs 60 to spread apart and thereby continuously urges the latch elements 42 outwardly against the tube wall 40 toward the latching position shown in FIG. 2. Legs 60 may be flexed toward and away from one another about the bight 62, and the latch elements 42 are thus able to move about the hinge axis provided by the bight 62. The fit of the bent ends 66 in passages 68 maintains the components of the latch in their assembled condition.

In use, the latch mechanism securely latches the ladder 10 to the boat stern 12 when tubes 22 are fully inserted into the sockets 26. As each tube is inserted into its socket, the cam surfaces 56 of each latch element move into engagement with rib 30 and act against the rib by camming action to deflect the latch heads 48 inwardly from their normal latching positions. The spacing between the heads 48 allows them to be deflected inwardly far enough to assume the release position of the latch elements in which the heads 48 can pass through the restricted space 42. The release position is shown in FIG. 5. Due to the camming interaction between the cam surfaces 56 and ribs 30, each tube 22 can be fully inserted into its socket 26 without the need for depression of the release buttons 44.

When each tube 22 has been fully inserted into its socket 26, the end of the tube butts against rib 30, and the grooves 50 are aligned with rib 30. At this time, the heads 48 have cleared rib 30, and the force applied by the spring wire 58 snaps the latch elements 42 to their latching position shown in FIG. 2. In this position, rib 30 fits closely in grooves 50 and shoulders 52 are engaged against the latching surface 54 on rib 30. The latch arrangement then securely holds the boarding ladder 10 in place on the boat.

Forces which are applied to the ladder 10 tending to pull the tubes 22 out of sockets 26 result in the application of forces between the heads 48 and the rib 30. It has been found that the latch mechanism is able to resist pulling forces up to 900 pounds without releasing the tubes from the sockets, and that the latch mechanism does not release until such time as the tubes themselves are badly deformed. The close fit of the release button 44 in the openings 46 holds the latch assembly rigidly in place on the tube 22.

The latch can be released by depressing the two diametrically opposed release buttons 44, as indicated by the directional arrows in FIG. 5. This causes the latch elements 42 to deflect about the hinge axis provided by the bight 62 of the spring wire 58. When the buttons 44 have been fully depressed, the heads 48 are disengaged from the latching surface 54, and the latch is then in the release position shown in FIG. 5 where the heads can simply be pulled through the restricted space 32 and past rib 30 out of the socket 26.

FIGS. 6 and 7 illustrate an alternative embodiment of the invention in which the latch assembly shown in FIGS. 2-5 is replaced by a spring wire 100 bent in compound fashion. The arrangement of FIGS. 6-7 also includes a modified socket arrangement in which the latch plate 102 has a peripheral flange 104 and a cylindrical socket 106 formed within a socket wall 108. The socket wall 108 projects outwardly from the latch plate 102 rather than inwardly as is the case with the recessed socket shown in FIGS. 2 and 5. The latch plate 102 projects inwardly beyond the socket wall 108 to form an annular rib 110 having a flat latching surface 112 which faces away from the end of the tube 22 and the open end of the socket 106. Holes 114 are formed in the latch plate 102 outwardly of the socket wall 108 and receives screws which are threaded into the stern 12 in order to secure the latch plate in place.

It should be pointed out that the latch plate and socket shown in FIG. 6 can be used with the latch mechanism shown in FIG. 2, and that the latch plate and socket shown in FIGS. 2 and 5 can be used with the bent spring wire 100. The latch plate and socket shown in FIG. 6 does not require the drilling of a hole through the stern 12, although the socket projects outwardly away from the stern.

The bent spring wire 100 includes a pair of opposing legs 118 which form the latch elements and which are connected at one end by a curved bight 120 of the spring wire. U-shaped release buttons project outwardly from the legs 118 and extend through the diametrically opposed openings 46 formed through the tube wall 40. The latch heads of the spring wire 100 are formed by hook shaped end portions 124 on the free ends of the spring wire 100. Each hook shaped end portion 124 terminates in a blunt tip 126 which forms a shoulder for engagement with the latching surface 112.

The hooked end portions 124 are carried on arms 128 which extend from the U-shaped release buttons 122. The legs 118 angle away from one another slightly as they extend away from the bight 120. Accordingly, the arms 128 and hooked end portions 124 are located in planes which are offset from one another, as best shown in FIG. 7, so that the end portions 124 can be deflected inwardly and overlapped with one another in the release position of the latch.

In use, the latch mechanism shown in FIGS. 6 and 7 functions in substantially the same manner as the latch mechanism described previously. The internal spring force of spring wire 100 continuously biases the end portions 124 away from one another to normally maintain them in the latching position shown in FIG. 6. However, when the tube 22 is inserted in socket 106, the curved surfaces of the end portions 124 engage the rib 110, and the camming interaction that results causes the end portions 124 to deflect inwardly to the release position of the latch. In the release position, the end portions 124 can be passed through the restricted space 113 until the end of the tube wall 40 is butted against the rib 110. Then, the tips 126 have cleared the rib, and the spring force urges the end portions 124 to spread apart such that they are hooked around rib 110 with the blunt tips 126 engaged against the latching surface 112. The latch is thereafter able to resist forces tending to pull the tube 22 out of socket 106, and the boarding ladder or other accessory is thus securely latched to the stern 12.

When the release buttons 122 are depressed, end portions 124 are deflected inwardly about the hinge axis provided by the curved bight 120. When the end portions 124 have been deflected inwardly far enough to enter the restricted space 113, the latch mechanism is released, and tube 22 may be pulled to pass the end portions 124 through the restricted space 113 and past the rib 110. Tube 22 is then released and can be pulled out of the socket 106.

Although the latch mechanism of the present invention is particularly well suited to latch a boat ladder to a small boat, it is also able to function to latch other boat accessories in place on a boat. For example, either of the latch plates 24 or 102 can be secured on the boat deck, and the latch mechanism can be carried in a tube extending from a ski tow bar. When the tube is inserted in the socket, the tow bar is latched in place and can be used to tow water skiers. When not in use, the tow bar can be detached by releasing the latch and pulling the tube out of the socket.

In addition, the latch can be used to mount lights on the bow and/or stern of a small boat. When the latch is engaged to latch the light on the boat, the spring action of the latch assembly establishes and maintains the necessary wiping electrical contact necessary to supply current to the light while at the same time allowing it to be rotated to adjust its aim. In an application where the latch is used for the mounting of a light or other electrical component, the latch elements 42 are constructed of plastic or another insulating material, and an electrical conductor is carried on each latch element and terminates in a contact located on the shoulder 52 where it can engage another contact on the latch surface 54. Thus, electrical contact is made at all times between the wiping contacts, and the contact is able to be maintained even in a marine environment where moisture and corrosion can present significant problems.

If desired, the latch mechanism can be keyed against rotation rather than permitting rotation of the tube as shown.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A latch mechanism for securing a boat accessory to a boat, said latch mechanism comprising:
    a latch plate presenting a socket having a wall and an open end;
    means for securing said latch plate to the boat;
    a latch surface in said socket facing generally away from the open end thereof;
    a tube extending from the accessory and having a tube wall terminating in an open end of the tube, said tube wall having a size and shape to closely enter the socket;
    a pair of opposing latch elements carried in said tube and each having a head projecting beyond the end of the tube and presenting a shoulder for latching engagement with said latch surface;
    means for mounting said latch elements to the tube for movement between a latching position and a release position, said shoulders being engageable with said latch surface in the latching position to latch the tube in the socket and said heads being passable through said socket in the release position;
    yieldable means for urging said latch elements toward the latching position; and
    a release element projecting from each latch element through the tube wall, said release elements being accessible to effect movement of the latch elements to the release position.

2. A latch mechanism as set forth in claim 1, including a rib in said socket projecting from the wall of the socket, said rib presenting said latch surface thereon.

3. A latch mechanism as set forth in claim 2, wherein said rib defines a restricted space in said socket, said heads being passable through said restricted space in the release position.

4. A latch mechanism as set forth in claim 3, including a cam surface on each head acting against said rib by camming action to effect the release position of said latch elements upon insertion of said tube into the socket.

5. A latch mechanism in claim 2, including a groove on each latch element adjacent the head thereof, said grooves closely receiving said rib when the tube is fully inserted in said socket and said latch elements are in the latching position.

6. A latch mechanism as set forth in claim 1, wherein said release elements comprise buttons located on opposite sides of said tube.

7. A latch mechanism as set forth in claim 1, wherein said yieldable means comprises a generally U-shaped wire having a pair of leg portions engaging the respective latch elements and a curved bight portion, said wire comprising a spring wire acting to bias said leg portions away from one another to urge said latch elements toward the latching position.

8. A latch mechanism as set forth in claim 7, including a groove in each latch element closely receiving the corresponding leg portion of said wire.

9. A latch mechanism as set forth in claim 8, including:
- a passage in each latch element adjacent the groove therein; and
- a bent end of each leg portion of said wire, said bent ends fitting in said passages to maintain the latch elements and wire assembled in the tube.

10. A latch mechanism as set forth in claim 1, wherein said latch elements comprise leg portions of a spring wire having a curved bight connecting the leg portions, said leg portions being flexible generally toward and away from one another about said bight between the latching and release positions.

11. A latch mechanism as set forth in claim 10, wherein said heads of the latch elements comprise hooked end portions of said leg portions of the wire, said hooked end portions overlapping one another in the release position of the latch elements and each hooked end portion terminating in a free tip providing said shoulder.

12. A latch mechanism for securing a boat accessory to a boat, said latch mechanism comprising:
- a latch plate presenting a socket having a wall;
- means for securing said latch plate to the boat;
- a rib projecting into said socket from the wall thereof, said rib defining a restricted space in the socket;
- a tube extending from the accessory and having a tube wall terminating in an open end of the tube, said tube wall having a size and shape to closely enter the socket;
- a latch assembly carried in said tube and including a pair of latch heads projecting beyond said end of the tube and each presenting a shoulder for latching engagement with said rib;
- means for mounting said latch assembly to said tube in a manner permitting said latch heads to move generally toward and away from one another about a hinge axis between a latching position and a release position, said shoulders being engageable against said rib in the latching position to latch the tube in the socket and said heads being passable through said restricted space in the release position for insertion of the tube into and removal of the tube from the socket;
- yieldable means for biasing said latch heads in a direction generally away from one another about said hinge axis;
- a release element projecting through the tube wall from each element at a location offset from said hinge axis, said release elements being accessible to effect movement of the latch heads toward one another about said hinge axis to the release position.

13. A latch mechanism as set forth in claim 12, including a cam surface on the leading end of each latch head arranged to act against said rib to deflect said latch heads from the latching position to the release position by camming action as said tube is inserted into said socket.

14. A latch mechanism as set forth in claim 12, including a groove adjacent each latch head, said grooves projecting beyond the open end of the tube and being adjacent thereto at a location to closely receive said rib with said open end of the tube butted against said rib when the tube is fully inserted into the socket and said latch heads are in the latching position.

15. A latch mechanism as set forth in claim 12, wherein:
- said latch assembly includes a pair of opposed latch elements carrying said latch heads thereon;
- said yieldable means comprises a generally U-shaped spring wire having a curved bight and a pair of legs extending from the bight and acting against said latch elements in a manner to urge them apart.

16. A latch mechanism as set forth in claim 12, wherein said latch assembly comprises a spring wire having a curved bight connecting a pair of leg portions which are flexible generally toward and away from one another about said bight, said latch heads comprising hooked end portions of said leg portions which overlap one another in the release position and which terminate in free tips providing said shoulders.

17. A latch mechanism for securing a ladder to a boat, said latch mechanism comprising:
- a pair of latch plates each presenting a socket defined within a wall extending from the latch plate;
- means for securing said latch plates to the boat at spaced apart locations;
- a rib projecting into each socket from the wall thereof, each rib defining a restricted space in the socket;
- a pair of hollow tubes rigid with the ladder and extending therefrom in substantially parallel relationship to one another, said tubes being located and sized to closely enter the respective sockets and each tube having an open end portion providing a tube wall;
- a pair of opposing latch elements carried in the end portion of each tube and each having a latching portion extending out of the end portion of the tube, the latch elements in each pair being movable between a latching position wherein the latch elements are engaged against the tube wall and a release position wherein the latching portions of said elements are displaced from the tube walls;
- a head on the latching portion of each element, said heads being engageable with said ribs in a manner to hold said tubes in the sockets when the tubes are fully inserted therein and said latch elements are in their latching positions, said heads being passable through said restricted space in the release positions of said latching portions;
- yieldable means for urging said latch elements toward the latching position; and a release element projecting from each latch element through the tube wall, said release elements being accessible to effect movement of the latch elements to the release positions thereof.

18. A latch mechanism as set forth in claim 17, including a cam surface on each of said heads engageable against said rib to effect the release position by camming interaction between said cam surfaces and ribs upon insertion of said tubes into said sockets.

19. A latch mechanism as set forth in claim 17, including a groove in each latch element adjacent the head thereof at a location to closely receive said rib therein when the tube is butted against the rib and the latch elements in the tube are in the latching position.

20. A latch mechanism as set forth in claim 17, wherein the latch elements in each pair comprise legs of a spring wire having a curved bight connecting the legs, said legs being flexible about said bight between the latching and release positions.

* * * * *